US008461741B2

(12) United States Patent
Dorsey

(10) Patent No.: US 8,461,741 B2
(45) Date of Patent: Jun. 11, 2013

(54) LOW FRICTION SUPPORT SYSTEM FOR DYNAMOELECTRIC MACHINE

(75) Inventor: David Norwood Dorsey, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 12/904,585

(22) Filed: Oct. 14, 2010

(65) Prior Publication Data

US 2012/0091853 A1    Apr. 19, 2012

(51) Int. Cl.
*H02K 3/50* (2006.01)
*H02K 3/44* (2006.01)

(52) U.S. Cl.
USPC .............. 310/260; 310/214; 310/270

(58) Field of Classification Search
USPC .......................... 310/260, 214, 270
IPC ................................ H02K 3/50,3/44
See application file for complete search history.

(56) References Cited

U.S. PATENT DOCUMENTS

| | | | |
|---|---|---|---|
| 3,089,048 A | 5/1963 | Bahn et al. | |
| RE28,478 E * | 7/1975 | Bahn et al. | 310/260 |
| 3,991,334 A | 11/1976 | Cooper et al. | |
| 4,456,843 A * | 6/1984 | Heyne et al. | 310/68 D |
| 4,488,079 A | 12/1984 | Dailey et al. | |
| 4,501,985 A | 2/1985 | Dobson et al. | |
| 5,436,520 A * | 7/1995 | Huber | 310/260 |
| 5,485,050 A * | 1/1996 | Zimmermann | 310/260 |
| 5,583,388 A * | 12/1996 | Paroz et al. | 310/260 |
| 6,965,184 B2 * | 11/2005 | Hediger et al. | 310/260 |

FOREIGN PATENT DOCUMENTS

| | | |
|---|---|---|
| GB | 961048 A | 6/1964 |
| GB | 1 491 048 A | 11/1977 |
| JP | 5260902 A | 5/1977 |
| JP | 64077440 A | 3/1989 |
| JP | 08280149 A * | 10/1996 |
| JP | 2011024331 A | 2/2011 |
| SU | 1390711 A1 | 4/1988 |

OTHER PUBLICATIONS

Machine translation of JP08-280149A (published: Oct. 1996, translated: Sep. 2012).*
Search Report issued in connection with GB Patent Application No. 1117587.4, Feb. 8, 2012.

* cited by examiner

*Primary Examiner* — Tran Nguyen
*Assistant Examiner* — Michael Andrews
(74) *Attorney, Agent, or Firm* — James W. Pemrick; Ernest G. Cusick; Frank A. Landgraff

(57) ABSTRACT

A support system is provided for a dynamoelectric machine having a stator and stator bars connected to a connection ring assembly. The support system includes at least one stator bar support bracket and one or more support rings connected to the stator bars. A connection ring support bracket supports the connection ring assembly. A mount is connected to the connection ring support bracket. The mount permits axial movement of the stator bars, the stator bar support bracket, the support rings, and the connection ring assembly due to thermal expansion experienced during operation of the dynamoelectric machine.

12 Claims, 8 Drawing Sheets

LOW FRICTION SUPPORT SYSTEM FOR DYNAMOELECTRIC MACHINE

BACKGROUND OF THE INVENTION

This invention relates to an improved support system for the conducting members of the stator of a dynamoelectric machine and more particularly it relates to an integral end turn support framework for a generator which is free to move axially as the stator windings expand and contract thermally.

The end turns of a dynamoelectric machine stator are the projecting portions of the armature bars that extend outwardly from longitudinal stator slots. The end turns are necessary in order to reverse the direction of the armature bar and to circumferentially displace the end of the bar so that it can enter a slot almost 180 degrees from the slot from which it emerged. The end turns must also diverge radially from the stator axis in order that they will not obstruct the rotor of the dynamoelectric machine that is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" (radially inner) and "bottom" (radially outer) bars, one practice is to bend the top bars so that they lie tangentially in one direction about this frusto-conical surface and to bend the bottom bars in the opposite tangential direction about the surface of revolution. The matter is further complicated by the fact that, although the top and bottom bars are closely adjacent at the location where they emerge from the slot, they must spread radially with respect to one another as they move away from the stator so that space will be afforded for a series loop connecting a top bar to a bottom bar.

With this background in mind, it will be appreciated that there are many difficulties in devising a suitable structure for supporting the insulated armature bars in the end turn region. The problem has become more acute with the advent of higher operational temperatures in machines, resulting in longer thermal expansion of the stator bars and the associated stresses of this thermal expansion in the structure. Substantial heat is generated by the passage of electric current through the armature bars and, even though effective gas or liquid cooling of the bars is provided, the thermal expansion and contraction of the bars with respect to the stator slots containing them will tend to move the end turns apart in an axial direction with respect to the longitudinal center of the stator.

One support method which has been used extensively to give the strength, yet the yieldability, required of an end winding support system has been to lash the projecting armature bars to a series of circumferential support "hoops." With this method, each bar is individually tied to a circumferential hoop with a strong flexible cord, such as glass cord impregnated with an adhesive such as epoxy resin. In a typical construction, there may be upwards of 72 (or more) top bars and bottom bars to be lashed to the circumferential hoops in the structure at either end of the stator.

In addition to separately securing the armature bars to a support structure with the foregoing method, they must be separated and secured with respect to one another. One method for accomplishing this is to use spacer blocks that conform to the space and are lashed to the armature bars. Connection rings are typically blocked in a similar fashion and tied using adhesive impregnated glass ties to ensure structural rigidity in the axial direction.

In many support structures the connection rings are securely attached to the stator frame and cannot move relative to the stator winding as it thermally grows. This can result in distortion of the electrical connection between the connection rings and the stator bars, or excessive forces being applied to the blocking components. This distortion/force can cause damage to the stator winding over the long-term operation of the machine.

The number of connection rings has increased in high output machines as the number of circuits has increased from one to two and now three or more winding circuits are used in the machine. This increases the banks of rings in the machine and makes installation of the rings more time consuming and more difficult to secure the rings and associated blocking because access to the components is more difficult as the number of banks of rings increases.

BRIEF DESCRIPTION OF THE INVENTION

In an aspect of the present invention, a support system for a dynamoelectric machine is provided. The dynamoelectric machine includes a stator, and stator bars connected to a connection ring assembly. The support system includes at least one support bracket for supporting the connection ring assembly, and a mount for permitting axial movement. The mount is connected to the support bracket, and permits axial movement of the stator bars and the connection ring assembly due to the thermal expansion experienced during operation of the dynamoelectric machine.

In another aspect of the present invention, a dynamoelectric machine is provided. The dynamoelectric machine includes a stator having stator bars connected to a connection ring assembly. The stator bars are connected to one or more support rings and a stator bar support bracket. A support system supports the connection ring assembly and includes at least one connection ring support bracket for supporting the connection ring assembly, and a mount for permitting axial movement connected to the connection ring support bracket. The support system permits axial movement of the stator bars, the stator bar support bracket, the support rings and the connection ring assembly due to thermal expansion experienced during operation of the dynamoelectric machine.

DETAILED DESCRIPTION OF THE INVENTION

Figure 1:
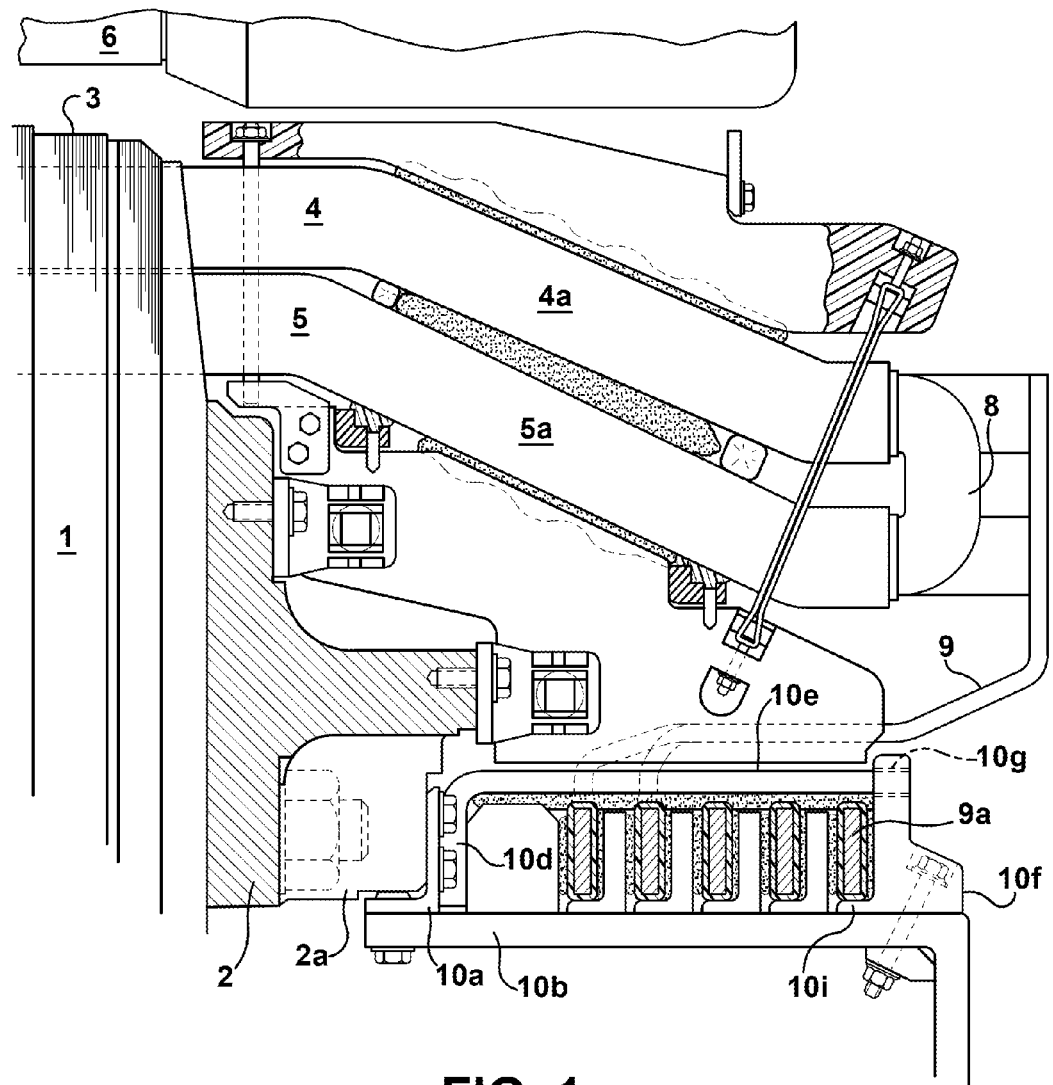
FIG. 1 is a is a horizontal elevation illustration, partly in section, of one known support system at one end of a generator.

Referring now to FIG. 1, a horizontal elevation view, of one known dynamoelectric machine, is shown of a portion of a stator 1 which includes a circumferential flange ring 2. The rotor 6 turns in bore 3 shown near the top of FIG. 1. The main structural members of the stator 1 including the flange ring 2 and other support members (not shown) enclose and support a large number of slotted core laminations defining the stator central bore 3 and through which pass the slot-lying portions of top armature bars 4 and bottom armature bars 5. Top bars 4 bend both circumferentially and radially as they come out of the slot and continue in an involute curve as shown at 4a. Similarly, bottom bars 5 also diverge radially but in an opposite circumferential sense as seen at 5a. Thus these portions 4a and 5a are both "skewed" with respect to the stator axis, and are bent in an involute-type configuration so as to lie tangentially to a frusto-conical surface of revolution taken about the stator axis.

The generator rotor 6 rotates in bore 3 of the stator 1. A top bar on one side of the stator circumference is connected with a bottom bar approximately diametrically opposite, this connection being made with a "series loop" 8. It will be understood that series loop 8 is rotated into the plane of the drawing in FIG. 1 in order to show the proper spacing of the members in a radial direction and that it does not actually connect the portions 4a and 5a emerging from the same slot.

At intervals about the stator circumference, power is withdrawn from the armature windings through leads 9 passing to circumferential connection rings 9a. Connection rings 9a, in turn, are connected to the high voltage outlet terminals (not shown). The support structure holding connection rings 9a in position is shown generally at 10. Several such connection ring support structures 10 are circumferentially spaced about the stator outside of the end turns and are attached to circumferential flange 2 by bolting to radial webs 2a made integral with the circumferential flange 2.

The connection ring support structure is supported by means of a flanged member 10a, the under side of which is rigidly bolted to an axially extending lower member 10b. An upper angle piece shown generally at 10e has a short leg 10d abutting the face of member 10a to prevent its movement toward the stator and a long leg 10e passing over the connection rings 9a and substantially parallel with lower member 10b. The long leg 10e is supported in a support 10f by means of a hole 10g receiving the end of long leg 10e. Support 10i is mounted to lower member 10b.

According to aspects of the present invention, an improved stator winding design for an electric generator is provided. The stator winding design allows the bank of connection rings to be assembled outside the machine and installed as a subassembly. The connection rings may be mounted on two (or more) supports that sit on a radial spring mounting configuration or a low friction material (e.g., polytetrafluoroethylene (PTFE) or Teflon® (a registered trademark of the E. I. du Pont de Nemours and Company), or any other suitable low friction material) slip plane allowing the connection rings to move when the stator winding thermally expands. The end winding is supported by a series of glass support rings with space blocks that position the support rings relative to each other. A block is installed between the glass support rings and the connection ring bank to integrate the two subassemblies to transfer the thermal forces from the end winding to the ring bank, causing it to flex (or slide).

Figure 2:
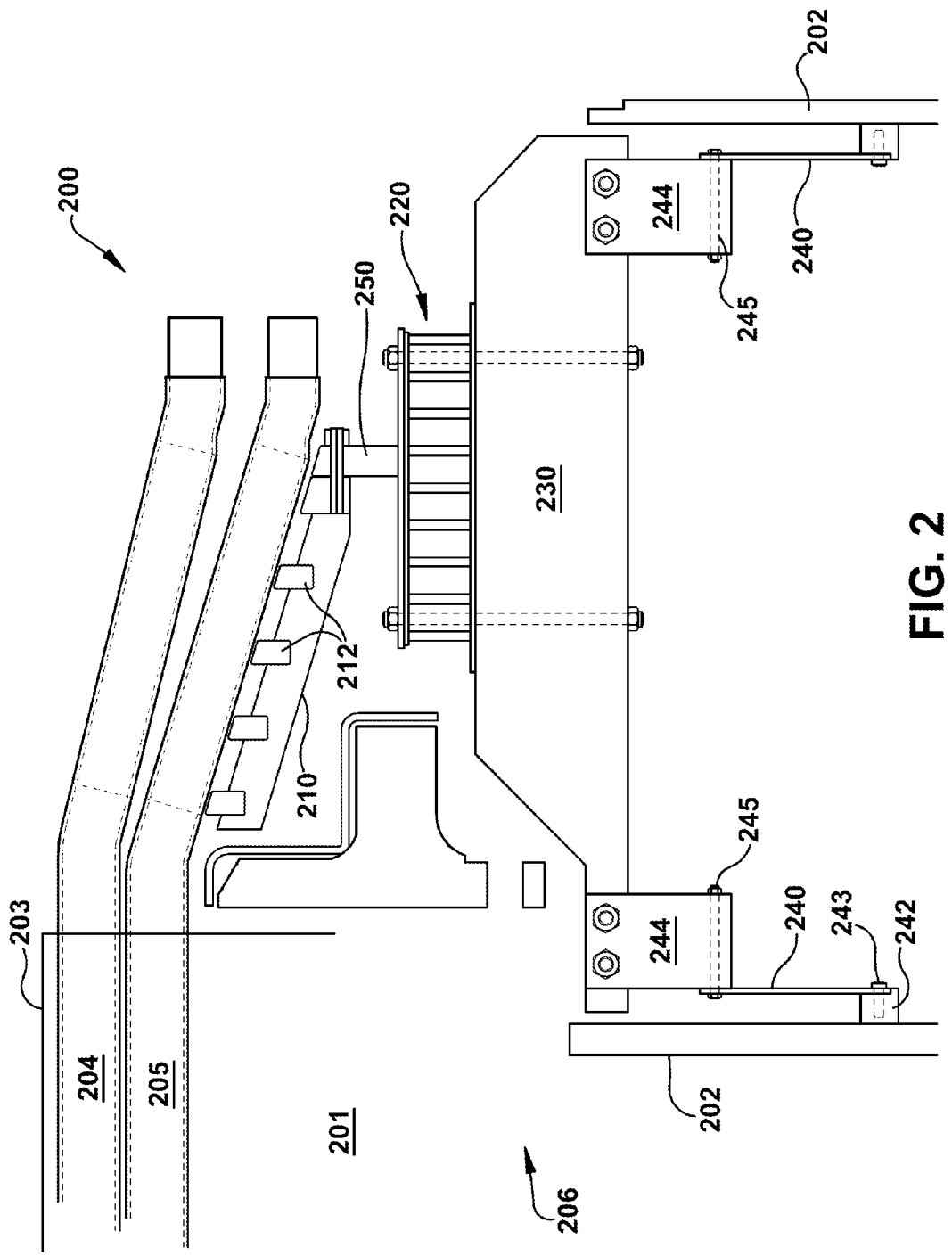
FIG. 2 is a is a horizontal elevation illustration, partly in section, of an improved support system at one end of a generator, according to an aspect of the present invention.

FIG. 2 illustrates a horizontal elevation view of a portion of a dynamoelectric machine 200, according to an aspect of the present invention. The stator 206 includes stator core 201 with windings having top stator bars 204 and bottom stator bars 205. The stator core defines a central bore 203, in which a rotor (not shown) resides. The stator bars 204, 205 are attached to support rings 212, the support rings 212 are attached to a stator bar support bracket 210, and the stator bar support bracket 210 and support rings 212 are attached to the connection ring assembly 220 via support block 250. The support rings 212 (or binding bands) encircle the stator bars 204, 205 and secure the stator bars to the stator bar support bracket 210.

The connection ring assembly 220 is mounted to a connection ring support bracket 230. The connection ring support bracket 230 is connected to the stator frame 202 (or any other suitable support structure) by spring elements 240. Support block 250 rigidly attaches the stator winding structure to the connection ring assembly 220 and connection ring support bracket 230. The spring 240 allows for axial movement of the stator bars 204, 205, connection ring assembly 220 and connection ring support bracket 230 as the stator axially expands or contracts due to the thermal expansion or contraction experienced during machine operation. For example, during operation of the dynamoelectric machine 200, the stator bars 204, 205 will heat up and lengthen in the axial direction. The springs 240 will flex or bend to accommodate this axial expansion (or contraction as the machine cools down) of the stator bars 204, 205. The spring 240 can be secured to the stator frame 202 by a spring mounting bracket 242 and one or more fasteners 243, and to the connection ring support bracket 230 by spring mounting bracket 244 and fasteners 245 and 246. The springs 240 and connection ring support bracket 230 as well as their associated fastening means function as a mount for permitting axial movement of the connection ring assembly 220 and stator bars 204, 205. Alternatively, the spring elements 240 could be mounted to the stator frame 202 (or other suitable support structure) using any suitable mounting means or arrangement, as desired in the specific application.

Figure 3:
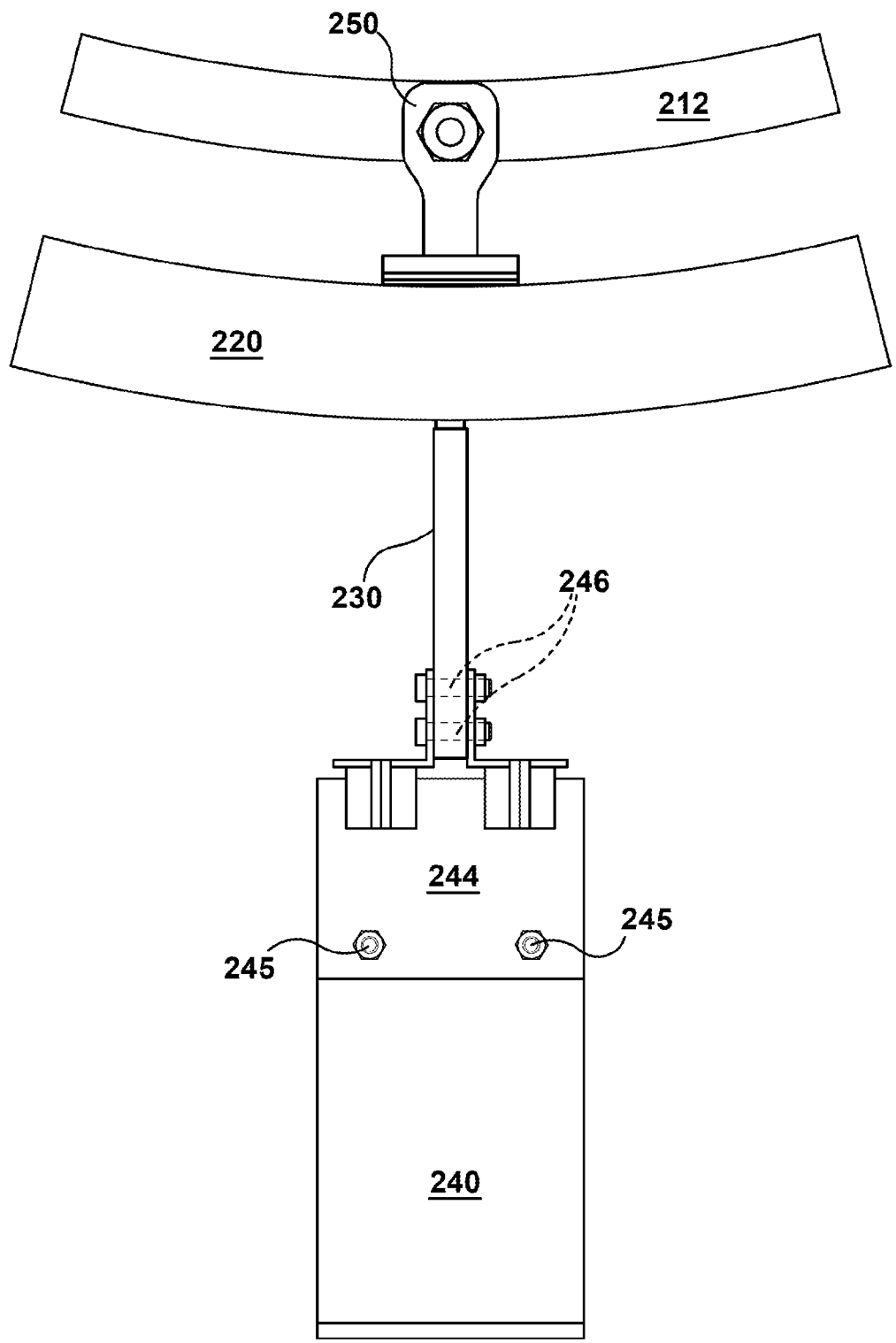
FIG. 3 is a is an end elevation illustration, partly in section, of an improved support system at one end of a generator, according to an aspect of the present invention.

FIG. 3 illustrates and end view of a portion of the connection ring support system. A portion of spring 240 is shown and is connected to connection ring support bracket 230 via spring mounting bracket 244 and fasteners 245 and 246. The connection ring support bracket 230 supports the connection ring assembly 220, which is connected via support block 250 to the stator bar support bracket 210 (not shown) and the support rings 212.

Figure 4:
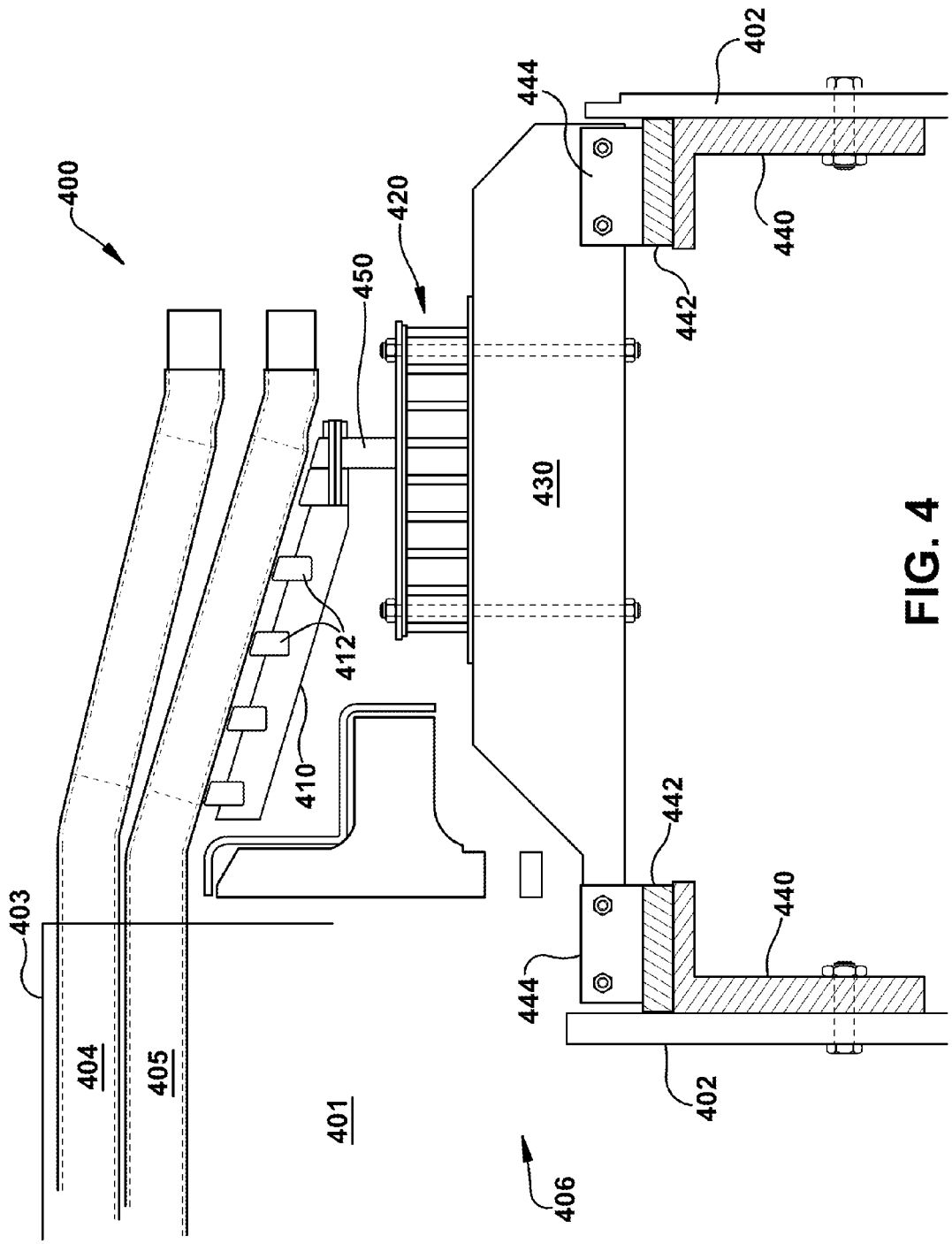
FIG. 4 is a is a horizontal elevation illustration, partly in section, of an improved support system at one end of a generator, according to an aspect of the present invention.

FIG. 4 illustrates a horizontal elevation view of a portion of a dynamoelectric machine 400, according to another aspect of the present invention. The stator 406 includes stator core 401 with windings having top stator bars 404 and bottom stator bars 405. The stator defines a central bore 403, in which a rotor (not shown) resides. The stator bars 404, 405 are attached to support rings 412, the support rings 412 are attached to a stator bar support bracket 410, and the stator bar support bracket 410 and support rings 412 are attached to the connection ring assembly 420 via support block 450. The support rings 412 (or binding bands) encircle the stator bars 404, 405 and secure the stator bars to the stator bar support bracket 410.

The connection ring assembly 420 is mounted to a connection ring support bracket 430. The connection ring support bracket 430 is connected to the stator frame 402 (or any other suitable mounting structure) by a low friction mount that allows for axial movement of the stator bars 404, 405, connection ring assembly 420 and connection ring support bracket 430 as the stator axially expands or contracts. The low friction mount includes a stator mounting bracket 440, low friction material 442 and optional support bracket brace 444. The connection ring support bracket 430 can slide axially along the low friction material 442 as the stator bars 404, 405 expand and contract due to the thermal expansion or contraction experienced during machine operation. The low friction material 442 can be polytetrafluoroethylene (PTFE), Teflon® (a registered trademark of the E. I. du Pont de Nemours and Company) or any other suitable low friction material. The low friction material 442, stator mounting bracket 440 and connection ring support bracket 430 as well as their associated fastening means function as a mount for permitting axial movement of the connection ring assembly 420 and stator bars 404, 405. The low friction material 442 can also be incorporated into the stator mounting bracket 440 and/or support bracket brace 444. If the support bracket brace 444 was omitted, the low friction material could also be incorporated into the bottom of connection ring support bracket 430 or the top of stator mounting bracket 440.

Figure 5:
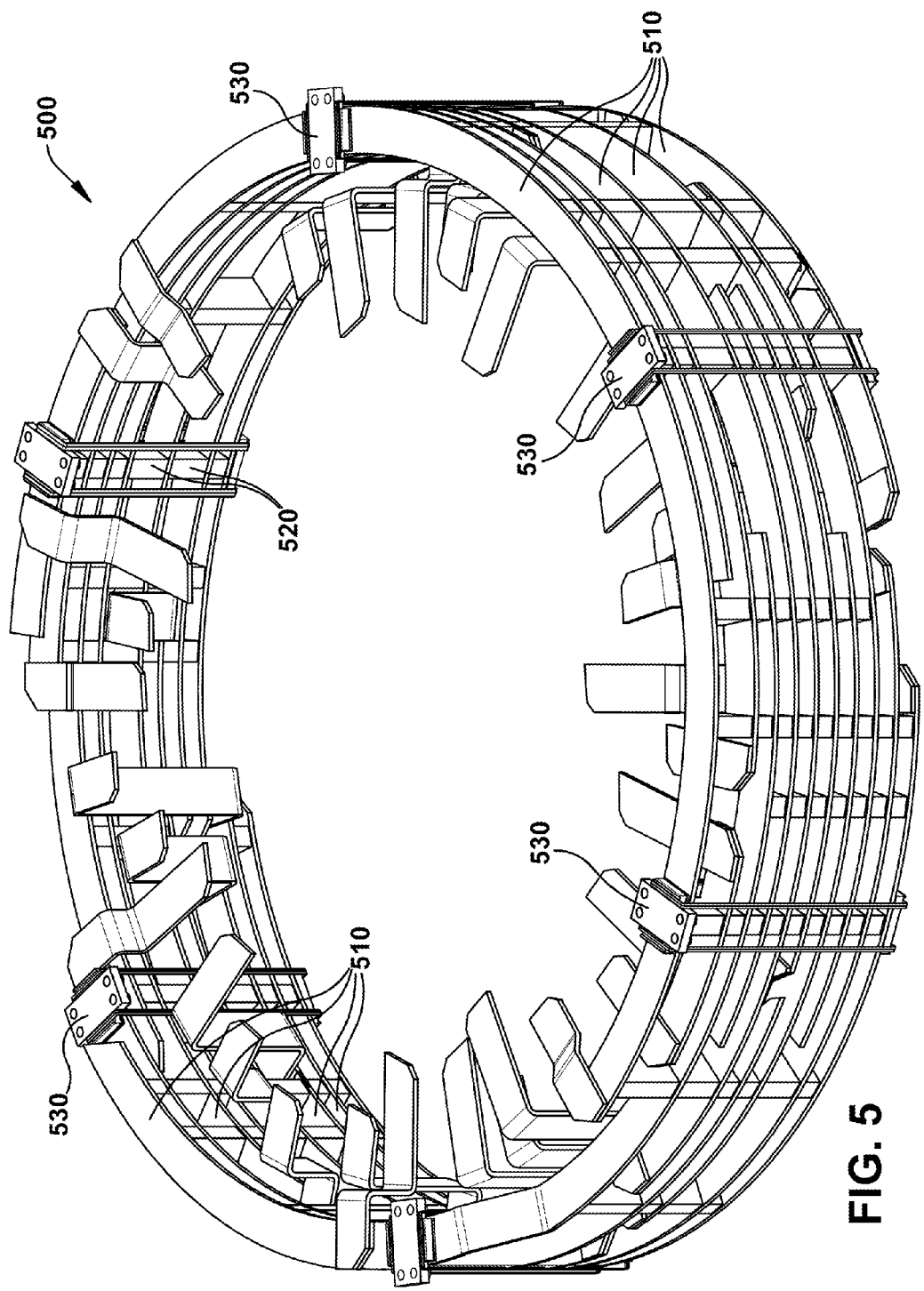
FIG. 5 is a is perspective illustration of a connection ring assembly, according to an aspect of the present invention.

FIG. 5 illustrates a perspective view of a connection ring assembly 500 that can be assembled outside of the machine, according to one aspect of the present invention. The assembly 500 consists of the connection rings 510 (needed for the stator winding) and the associated support blocking 520, the adhesives (not shown) for bonding the blocks 520 to the connection rings 510, and the glass banding (not shown) to secure all the connection rings 520 together as a connection ring assembly 500. Lifting provisions 530 are incorporated into the support blocking design to facilitate the lifting of the assembly 500 into the desired position in the dynamoelectric machine.

Figure 6:
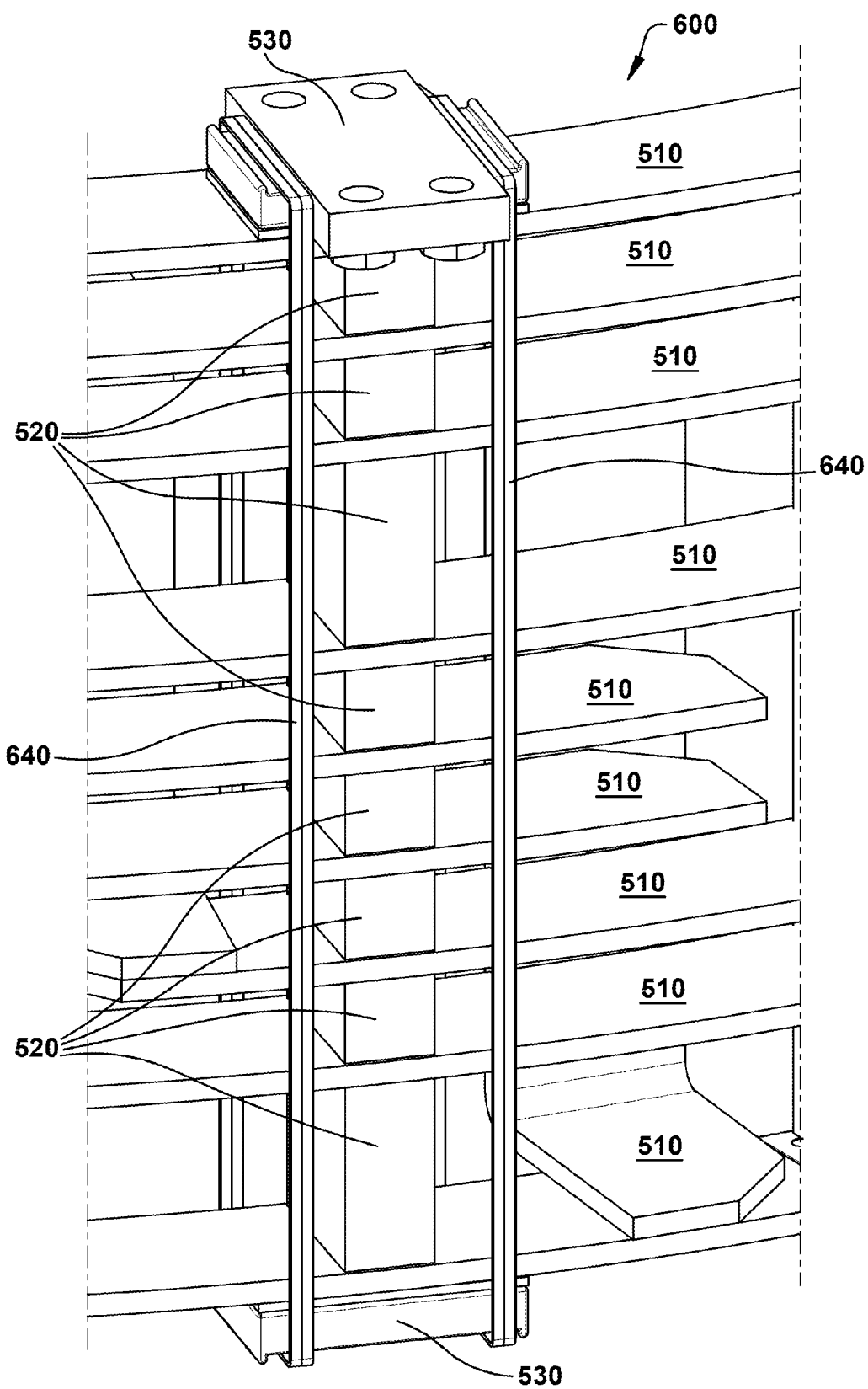
FIG. 6 is a is perspective illustration of a blocking assembly, according to an aspect of the present invention.

FIG. 6 illustrates a perspective view of a blocking assembly 600, used to support the connection rings 510. Support blocks 520 are located between the banks of connection rings 510. The interface point, at lifting provision 530, for lifting the subassembly is also shown. The glass banding 640 is used to secure the rings for lifting, and could also be accomplished using other clamping means such as long threaded fasteners and associated hardware.

Figure 7:
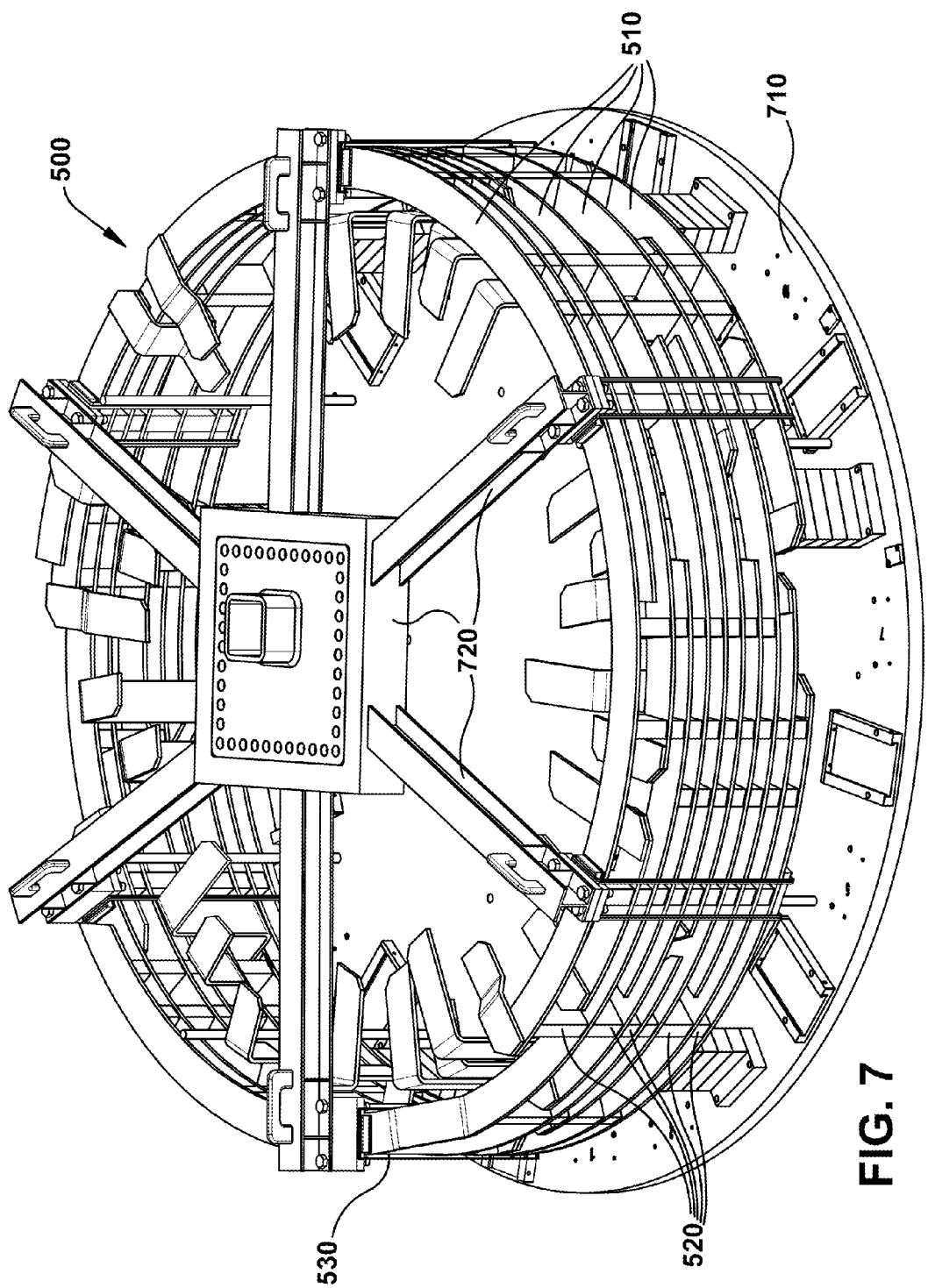
FIG. 7 is a is perspective illustration of a connection ring assembly connected to a lifting beam assembly, according to an aspect of the present invention.
Figure 8:
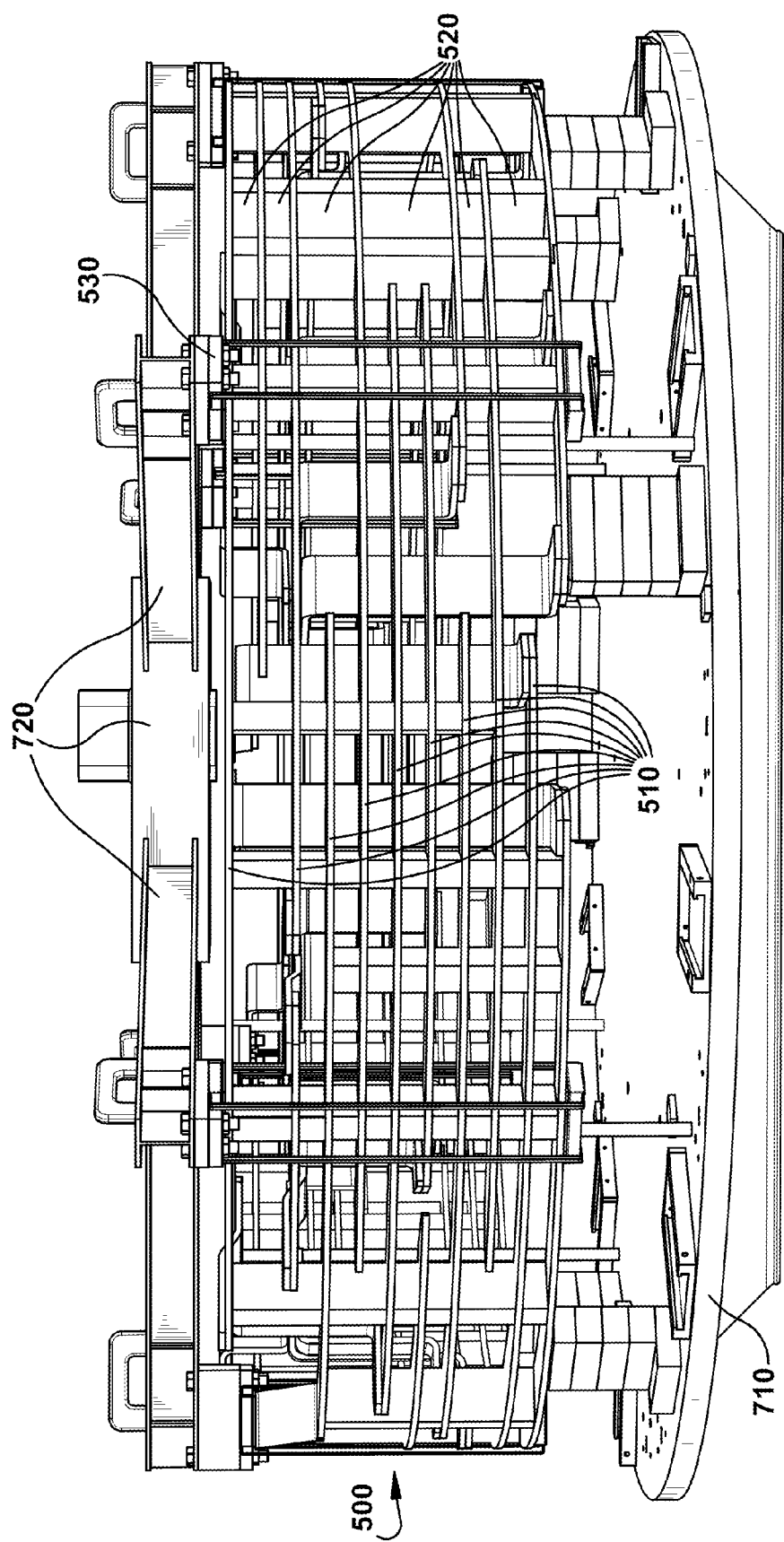
FIG. 8 is a side view illustration of a connection ring assembly and a lifting beam assembly, according to an aspect of the present invention.

FIG. 7 illustrates a perspective view of a connection ring assembly 500 placed on an assembly table 710. A lifting beam assembly 720 is shown attached to lifting provisions 530. FIG. 8 illustrates a side view of a connection ring assembly 500 with the attached lifting beam assembly 720. The assembly table 710 allows an operator or technician to easily install the banks of connection rings 510 and associated support blocking 520. When complete, the entire assembly 500 can be lifted (by any suitable lifting apparatus) and positioned next to the ends of the stator bars.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A support system for a dynamoelectric machine having a stator and stator bars connected to a connection ring assembly, the support system comprising:
   at least one stator bar support bracket and one or more support rings connected to the stator bars;
   at least one connection ring support bracket for supporting the connection ring assembly;
   a mount for permitting axial movement connected to the at least one connection ring support bracket, the mount comprised of a low friction material that permits axial movement of the stator bars, the at least one stator bar support bracket, the one or more support rings, and the connection ring assembly due to the thermal expansion experienced during operation of the dynamoelectric machine;
   one or more support bracket braces attached to the at least one connection ring support bracket, the one or more support bracket braces in contact with the low friction material; and
   wherein, the mount permits axial movement of the stator bars, the at least one stator bar support bracket, the one or more support rings, and the connection ring assembly due to thermal expansion experienced during operation of the dynamoelectric machine.

2. The support system of claim 1, further comprising one or more stator mounting brackets in contact with the low friction material and connected to a stator frame.

3. The support system of claim 1, further comprising a support block connected to the connecting ring assembly and the at least one stator bar support bracket.

4. The support system of claim 1, wherein the low friction material is comprised of polytetrafluoroethylene (PTFE).

5. The support system of claim 1, the connection ring assembly further comprising:
   one or more connection rings;
   support blocking located between adjacent connection rings; and
   lifting provisions secured to the one or more connection rings, the lifting provisions for enabling the connection ring assembly to be lifted into position in the dynamoelectric machine.

6. The support system of claim 5, wherein the lifting provisions are secured to the one or more connection rings with glass banding.

7. The support system of claim 5, further comprising:
   a lifting beam assembly attached to the lifting provisions;
   wherein the lifting beam assembly is used to lift the connection ring assembly into position in the dynamoelectric machine.

8. A dynamoelectric machine comprising:
   a stator having stator bars connected to a connection ring assembly, the stator bars connected to one or more support rings and a stator bar support bracket;
   a support system for supporting the connection ring assembly, the support system comprising:
      at least one connection ring support bracket for supporting the connection ring assembly;
      a mount for permitting axial movement connected to the at least one connection ring support bracket, the mount comprised of a low friction material;
      one or more support bracket braces attached to the at least one connection ring support bracket, the one or more support bracket braces in contact with the low friction material; and
   wherein, the support system permits axial movement of the stator bars, the stator bar support bracket, the one or more support rings and the connection ring assembly due to thermal expansion experienced during operation of the dynamoelectric machine.

9. The dynamoelectric machine of claim 8, wherein the low friction material is comprised of polytetrafluoroethylene (PTFE).

10. The dynamoelectric machine of claim 8, wherein the connection ring assembly further comprises:
   one or more connection rings;
   support blocking located between adjacent connection rings; and lifting provisions secured to the one or more connection rings, the lifting provisions enabling the connection ring assembly to be lifted into position in the dynamoelectric machine.

11. The dynamoelectric machine of claim 10, wherein the lifting provisions are secured to the one or more connection rings with glass banding.

12. The dynamoelectric machine of claim 10, further comprising:

a lifting beam assembly attached to the lifting provisions;

wherein the lifting beam assembly is used to lift the connection ring assembly into position in the dynamoelectric machine.

\* \* \* \* \*